United States Patent
Jiang

(10) Patent No.: US 10,498,784 B2
(45) Date of Patent: Dec. 3, 2019

(54) METHOD FOR AN AUDIO/VIDEO LIVE BROADCAST IN AN HTML5-BASED BROWSER

(71) Applicant: Shanghai Hode Information Technology Co., Ltd., Shanghai (CN)

(72) Inventor: Jun Jiang, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 166 days.

(21) Appl. No.: 15/795,152

(22) Filed: Oct. 26, 2017

(65) Prior Publication Data
US 2018/0124140 A1     May 3, 2018

(30) Foreign Application Priority Data
Oct. 27, 2016 (CN) .......................... 2016 1 0954750

(51) Int. Cl.
*H04L 12/18* (2006.01)
*H04L 29/06* (2006.01)

(52) U.S. Cl.
CPC .......... *H04L 65/4076* (2013.01); *H04L 12/18* (2013.01); *H04L 65/608* (2013.01)

(58) Field of Classification Search
CPC . H04L 65/4076; H04L 12/18; H04L 12/1818; H04L 65/1069; H04L 65/608
USPC ....................................................... 709/231
See application file for complete search history.

(56) References Cited

U.S. PATENT DOCUMENTS

| | | | |
|---|---|---|---|
| 7,809,773 B2 | 10/2010 | Horowitz et al. | |
| 8,019,815 B2 | 9/2011 | Keener et al. | |
| 8,376,910 B2 | 2/2013 | Cheung et al. | |
| 8,545,369 B2 | 10/2013 | Cheung et al. | |
| 8,555,177 B1 | 10/2013 | Junee et al. | |
| 8,628,414 B2 | 1/2014 | Walker et al. | |
| 8,701,153 B2 | 4/2014 | Abrams | |
| 9,003,306 B2 | 4/2015 | Mehin et al. | |
| 9,253,225 B1 | 2/2016 | Junee et al. | |
| 9,332,315 B2 | 5/2016 | Agrawal | |
| 9,467,408 B1 * | 10/2016 | Sherman-Presser | H04N 21/25883 |

(Continued)

FOREIGN PATENT DOCUMENTS

CN     106060632 A     10/2016

OTHER PUBLICATIONS

Wang Liang; "Research and Practice on Real-Time Video Communication System on Mobile Terminals Supporting HTML5"; Information Science and Technology; No. 4; 2015; 22 pages. (contains English Abstract).

*Primary Examiner* — Sm A Rahman
*Assistant Examiner* — Chen-Liang Huang
(74) *Attorney, Agent, or Firm* — BakerHostetler

(57) ABSTRACT

The invention discloses a method for an audio/video live broadcast in a HTML5-based browser. There is a WebRTC-based communication channel built between a client end and a host end to do transmission for a video stream and an audio stream as well as a message transmission. After a communication is built between a client end and a host end, the client-end browser will receive data and process them while the network server only conducts works for verification, connections and heartbeat detection. A work to push streams does not need to be conducted by the server and thus the loading on the network server is reduced.

17 Claims, 3 Drawing Sheets

(56) References Cited

U.S. PATENT DOCUMENTS

| | | | |
|---|---|---|---|
| 2007/0113218 A1* | 5/2007 | Nolan | G06F 11/362 717/124 |
| 2009/0249223 A1 | 10/2009 | Barsook et al. | |
| 2012/0331496 A1 | 12/2012 | Copertino et al. | |
| 2013/0124738 A1* | 5/2013 | Lynch | H04L 12/6418 709/227 |
| 2013/0275492 A1* | 10/2013 | Kaufman | H04L 63/029 709/203 |
| 2013/0278824 A1* | 10/2013 | Einarsson | H04N 7/0885 348/468 |
| 2013/0326352 A1 | 12/2013 | Morton | |
| 2014/0012910 A1 | 1/2014 | White | |
| 2014/0013200 A1 | 1/2014 | White | |
| 2014/0081435 A1 | 3/2014 | Wagner | |
| 2014/0089801 A1 | 3/2014 | Agrawal | |
| 2014/0092127 A1 | 4/2014 | Kruglick | |
| 2014/0108524 A1* | 4/2014 | Good | H04L 65/4084 709/204 |
| 2015/0058418 A1* | 2/2015 | Singh | H04L 67/1097 709/204 |
| 2015/0082342 A1 | 3/2015 | Norwood et al. | |
| 2015/0261853 A1 | 9/2015 | Shao | |
| 2016/0117762 A1* | 4/2016 | Ahmad | G06Q 50/12 705/15 |
| 2016/0316272 A1 | 10/2016 | Li | |
| 2016/0342287 A1 | 11/2016 | Barker et al. | |
| 2016/0366089 A1* | 12/2016 | Bank | H04L 51/32 |
| 2017/0163422 A1* | 6/2017 | Chatterjee | H04L 9/32 |
| 2017/0214973 A1* | 7/2017 | Slaughter | H04N 21/4316 |
| 2017/0272488 A1* | 9/2017 | Totzke | H04N 21/41407 |
| 2018/0020098 A1* | 1/2018 | Cliche | H04M 7/006 |

\* cited by examiner

METHOD FOR AN AUDIO/VIDEO LIVE BROADCAST IN AN HTML5-BASED BROWSER

CROSS-REFERENCE TO RELATED APPLICATION

The present application is based on and claims priority of Chinese patent application No. 201610954750.1, filed Oct. 27, 2016. The entire disclosure of the above-identified application is hereby incorporated by reference herein and made a part of this specification.

FIELD OF THE INVENTION

The present invention relates to a method and system for an audio/video live broadcast in an HTML5-based browser.

BACKGROUND OF THE INVENTION

Current live broadcast for an audio/video is implemented by means of a live stream-push server. Loading of live broadcast is taken by the live stream-push server. As a result, operation loading on the server is very huge and it is not easy to process the data come from the pushed stream.

Current matured popular technology for a video communication comprises the following types.

One is WebRTC technology, which implements a web-based video meeting, and uses a standard of a WHATWG protocol. By means of providing a simple Javascript through browser, a capability for a real-time communications (RTC) is possible. The WebRTC technology provides a browser interface named "Media Stream API" to get data stream come from a camera or microphone, a browser interface named "RTC Peer Connection API" to build a stable and high efficient data flow transmission between a node to a node, as well as a browser interface named "RTC data Channel API" to build a high capacity and little delay communication channel between browsers (node to node).

A second one is popping-screen technology, wherein a popping-screen will appear in a video in real time during a period of playing the video. In such a situation, user can see popping-screens sent by himself and others when he is watching the video. During a progress of playing a video through a network, a server can get popping-screen messages from client terminals and add any popping-screen message published by respective client terminals for responding to the network-based video to the video in different timings so as to display such messages By means of such a way, client terminals are convenient to read any observation messages published by all client terminals when they are watching a video through a network.

A third one is WebSocket technology. The so-called WebSocket protocol is a new protocol used in HTML5 standard. It is possible to provide a full multiple task communication between a browser and a server, and to banefully save the resource and bandwidth used in the server so as to get a real-time communication.

A fourth one is NAT/Firewall traversal technology. The so-called Network Address Translation ("NAT" in abbreviation) is a technology that rewrites a source IP addresses and/or a destination IP addresses when IP packets are going to pass through a router or firewall. During a progress of a video conference, NAT traversal has played a vital role in a message communication between an internet and an intranet. There are two kinds of protocols for the NAT traversal. One is called STUN (Simple Traversal of UDP through NAT), UDP being a simple way to pass through NAT, the other is called TURN (Traversal Using Relay NAT), traversing NAT by means of relay. An ICE framework (Interactive Connectivity Establishment) is a comprehensive a framework for NAT traversal, and can accommodate with various NAT traversal technologies such as STUN, TURN (Traversal Using Relay NAT). ICE technology uses STUN first, trying to establish a UDP-based connection, and will use TCP if using STUN fails, by trying HTTP first and then trying HTTPS. If using TCP fails, ICE will use a relay-based TURN server. This relay-based server utilizes a Google's STUN server or a STUN server built by itself. Thus, a worst case is to use its own server for live streaming services.

For reducing the loading of the server, it is possible to utilize one of the above video communication technology to provide a browser-based audio/video live broadcast method so as to shift a portion of data processing work in the server to browser.

SUMMARY OF THE INVENTION

It is an object of the present invention to provide a method for an audio/video live broadcast in an HTML5-based browser. There is a WebRTC-based communication channel built between a client end and a host end so as to do transmission for a video stream and an audio stream as well as a message transmission. After a communication is built between a client end and a host end, the client-end browser will receive data and process them and the network server only conducts works for verification, connections and heartbeat detection. A work to push streams does not need to be conducted by the server and thus the loading on the network server is reduced.

In order to achieve the above object, the present invention is achieved by providing a method for an audio/video live broadcast in an HTML5-based browser, being characterized by comprising: building, being identified as step S1, a WebRTC-based communication connection between a host-end browser and a client-end browser by means of a network server; and receiving, being identified as step S2, a live broadcast data sent from the host end and processing such data by means of the client-end browser.

According to the above method, it is preferred that both of the host-end browser and the client-end browser are HTML5-based browsers.

According to the above method, the step of S1, i.e., building the connection, further comprises: registering the host-end browser by the host and building a WebSocket-based connection with the network server, and then acquiring an audio/video data stream sent from a host-end equipment, by means of a browser interface named Media Stream API, wherein the audio/video data stream comprise audio tracks and video tracks; registering the client-end browser by the client and building a WebSocket-based connection with the network server; and building a communication channel between the host end and the client end by means of the network server; wherein the network server utilizes an ICE framework to implement a NAT transversal, so as to build a communication channel for transmitting signals between the host end and the client end.

According to the above sub-steps, the host-end equipment comprises a camera and a microphone connected to the browser interface named "Media Stream API."

According to the above sub-steps, the signals comprises conversation messages used for initializing a communication and a debug process; network allocations including an IP address and a port; and media adaptations including an encoder and a differential rate acceptable to the browsers in both of a transmitting end and a receiving end.

According to the above method, the step of S2, i.e., receiving a live broadcast data sent from the host end and processing such data, further comprises: receiving and showing the live broadcast data sent from the host-end by means of the client browser; and processing popping-screen data by means of the client-end browser.

The sub-step of receiving and showing the live broadcast data sent from the host-end further comprises the following details. That is, the client-end browser receives an audio stream and a video stream sent from the host end, by means of a browser interface named RTC Peer Connection API, and then shows the audio stream and the video stream by means of a video tag in the HTML5-based browser. The client-end browser receives and show a text data sent from the host-end, by means of a browser interface named RTC data channel API. The text data comprises documents and popping-screen messages. The popping messages are displayed on a popping-screen layer.

According to the above method, the step of processing popping-screen data/messages further comprises the following details. That is, the client-end browser transmits the popping-screen messages to the host end by means of the browser interface named RTC data channel API. The client-end browser transmits the popping-screen messages to the network server by means of a WebSocket-based connection. The network server transmits popping-screen messages sent by other client ends, to the client-end browser by means of a WebSocket-based connection. The popping messages are displayed on a popping-screen layer.

In order to achieve the above object, the present invention further provides a system for an audio/video live broadcast in an HTML5-based browser, which comprises a host end equipment having a host-end browser for sending a live broadcast data to a client-end browser in a client end; and a network server for building a WebRTC-based communication connection between the host-end browser and the client-end browser.

It is preferred that the network server utilizes an ICE framework to implement a NAT transversal, so as to build a communication channel for transmitting signals between the host end and the client end. And, both of the host-end browser and the client-end browser are HTML5-based browsers. The host end equipment further comprises a browser interface named Media Stream API, and a camera and a microphone connected to the browser interface named Media Stream API.

In accordance with the present invention, there is a WebRTC-based communication channel built between a client end and a host end so as to do transmission for a video stream and an audio stream as well as a message transmission. After a communication is built between a client end and a host end, the client-end browser will receive data and process them while the network server only conducts works for verification, connections and heartbeat detection. A work to push stream does not need to be conducted by the server and thus the loading on the network server is reduced.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF THE INVENTION

The invention will now be described in further detail with reference to the accompanying drawings, in which a preferred embodiment is set forth in detail.

Figure 1:
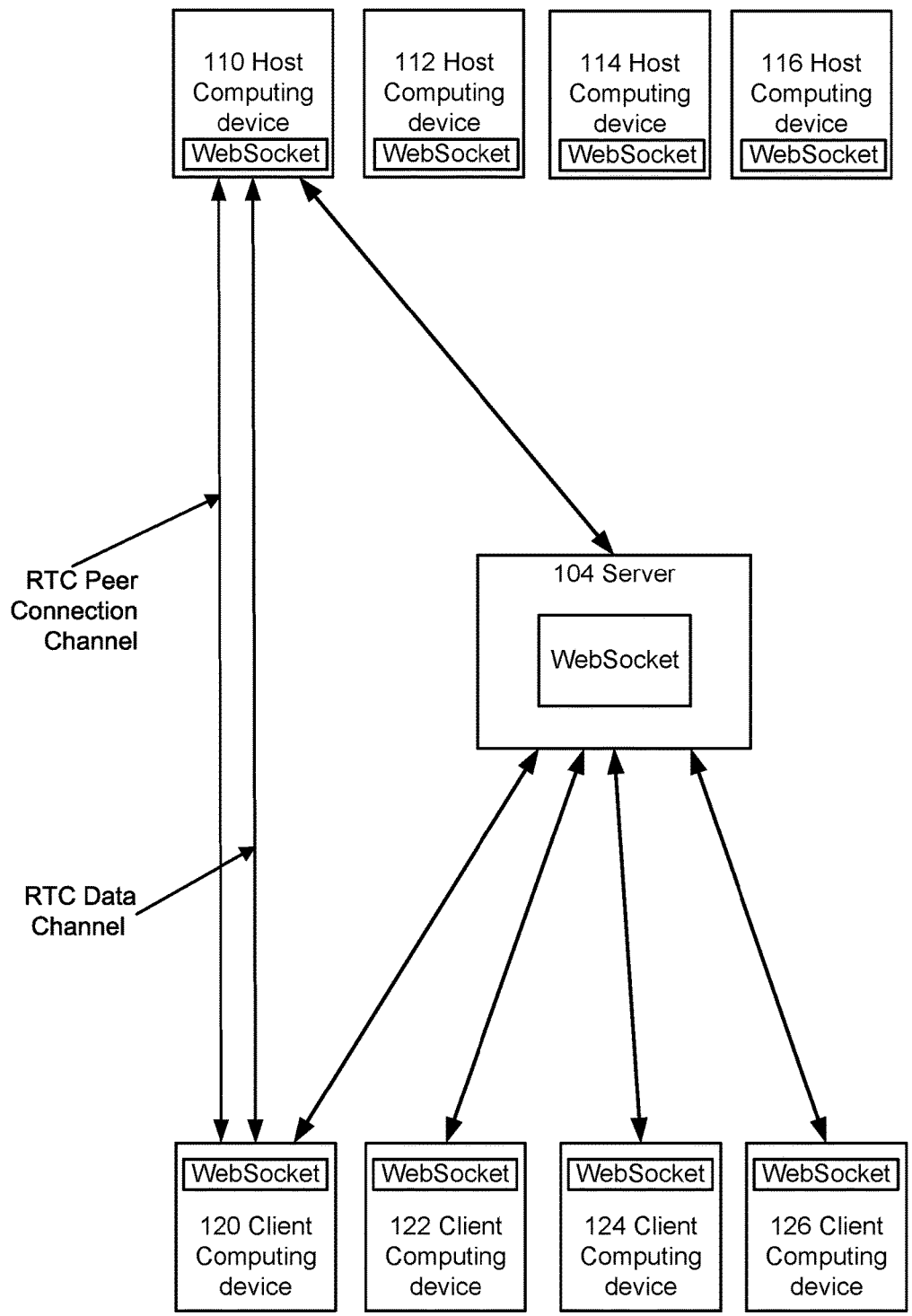
FIG. 1 depicts a block diagram of an operational environment for an audio/video live casting system in accordance with the present invention.

In an exemplary configuration shown by FIG. 1, an audio/video live casting system may comprise a plurality of host computing devices (e.g., host computing devices 110-116). One or more of the plurality of host computing devices may send live casting data to one or more of a plurality of client computing devices (e.g., client computing devices 120-126). The audio/video live casting system may further comprise a server 104. The server 104 may establish RTC-based peer connection channel and RTC-based data channel. WebSocket-based connection may be established among the server 104, the plurality of the host computing devices, and the plurality of the client computing devices.

Figure 2:
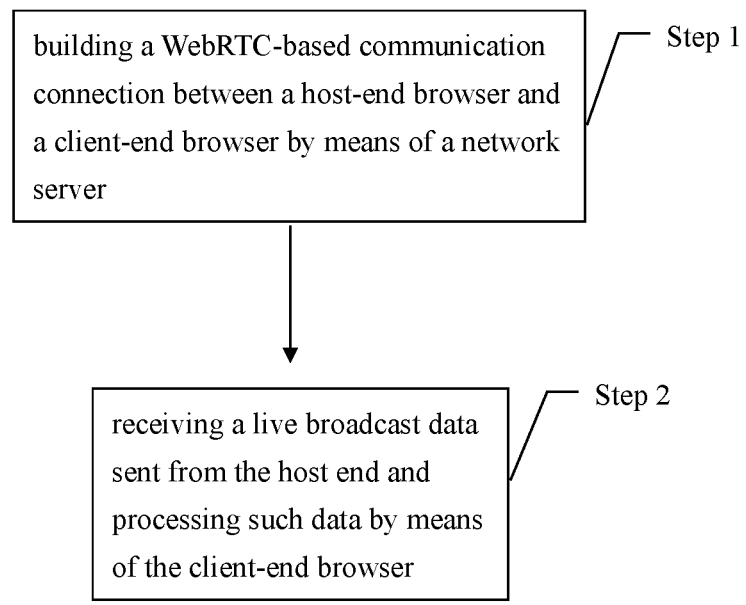
FIG. 2 is a flow chart of a method for an audio/video live broadcast in a HTML5-based browser in accordance with one embodiment of the present invention.

As shown in FIG. 2, a method for an audio/video live broadcast in an HTML5-based browser according to one embodiment of the present invention is disclosed. The method in this embodiment comprises: building, being identified as step S1, a WebRTC-based communication connection between a host-end browser and a client-end browser by means of a network server; and receiving, being identified as step S2, a live broadcast data sent from the host end and processing such data by means of the client-end browser.

In this embodiment, both of the host-end browser and the client-end browser are HTML5-based browsers.

Moreover, the step of S1, i.e., building the connection, further comprises a sub-step of registering the host-end browser by the host and building a WebSocket-based connection with the network server, and then acquiring an audio/video data stream sent from a host-end equipment, by means of a browser interface named "Media Stream API," wherein the host-end equipment comprises a camera and a microphone connected to the browser interface named "Media Stream API," and the audio/video data stream comprise audio tracks and video tracks.

A sub-step of registering the client-end browser by the client and building a WebSocket-based connection with the network server is further included.

Furthermore, a sub-step of building a communication channel between the host end and the client end by means of the network server is also included, wherein the network server utilizes an ICE framework to implement a NAT transversal, so as to build a communication channel for transmitting signals between the host end and the client end.

In this embodiment, the signals comprises conversation messages used for initializing a communication and a debug process; network allocations including an IP address and a port; and media adaptations including an encoder and a differential rate acceptable to the browsers in both of a transmitting end and a receiving end.

In this embodiment of the present invention, the step of S2, i.e., receiving a live broadcast data sent from the host end and processing such data, further comprises a sub-step of receiving and showing the live broadcast data sent from the host-end by means of the client browser, as well as a sub-step of processing popping-screen data/messages by means of the client-end browser.

The sub-step of receiving and showing the live broadcast data sent from the host-end further comprises the following details. That is, the client-end browser receives an audio stream and a video stream sent from the host end, by means of in browser interface named "RTC Peer Connection API," and then shows the audio stream and the video stream by means of a video tag in the HTML5-based browser. The client-end browser receives and shows a text data sent from the host-end, by means of a browser interface named "RTC data channel API." The text data comprises documents and popping-screen messages. The popping-screen messages are displayed on a popping-screen layer.

Furthermore, the step of processing popping-screen data/messages further comprises the following details. That is, the client-end browser transmits the popping-screen messages to the host end by means of the browser interface named "RTC data channel API". The client-end browser transmits the popping-screen messages to the network server by means of a WebSocket-based connection. In this embodiment according to the present invention which provides a method for a audio/video live broadcast in a HTML5-based browser, the network server further transmits popping-screen messages sent by other client ends, to the client-end browser by means of a WebSocket-based connection. The client-end browser displays the popping messages by means of a popping-screen layer.

In accordance with the present invention which provides a method for a audio/video live broadcast in a HTML5-based browser, there is a WebRTC-based communication channel built between a client terminal and a host so as to do transmission for a video stream and an audio stream as well as a message transmission. In comparison with conventional live broadcast technology that pushes streams by means a server, this embodiment according to the present invention can control the client-end browser to receive data and process them after a communication is built between the client end and the host end. And, the network server only conducts works for verification, connections and heartbeat detection. A work to push streams does not need to be conducted by the server and thus the loading on the network server is reduced.

According the embodiment mentioned above, the present invention thus also provides a system for an audio/video live broadcast in an HTML5-based browser, which comprises a host end equipment having a host-end browser for sending a live broadcast data to a client-end browser in a client end; and a network server for building a WebRTC-based communication connection between the host-end browser and the client-end browser.

The network server utilizes an ICE framework to implement a NAT transversal, so as to build a communication channel for transmitting signals between the host end and the client end. And, both of the host-end browser and the client-end browser are HTML5-based browsers.

Furthermore, the host end equipment further comprises a browser interface named Media Stream API, and a camera and a microphone connected to the browser interface named Media Stream API.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 3:
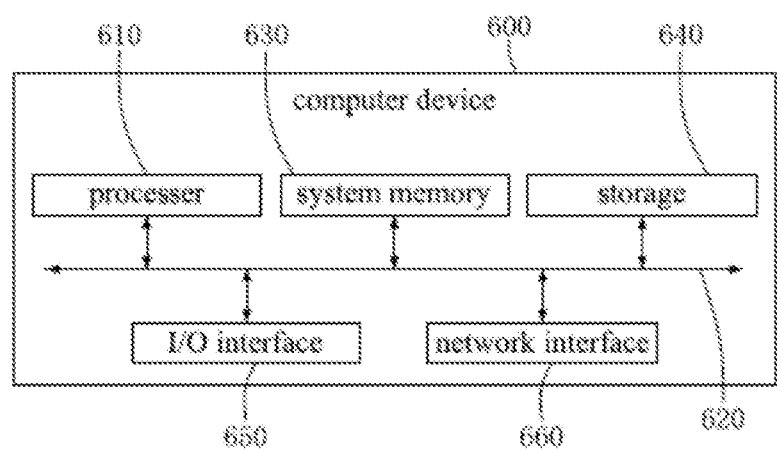
FIG. 3 is a diagram illustrating an example computing system that may be used in one embodiment of the present invention.

In at least some embodiments, a server or computing device that implements a portion or all of one or more of the technologies described herein, including the techniques to implement the functionality of the server 200, the client terminal 100, may include a general-purpose computer system that includes or is configured to access one or more computer-accessible media. FIG. 3 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for an audio/video live broadcast via an HTML5-based browser among a network community comprising a plurality of hosts, a network server, and a plurality of clients, comprising:
    building a WebRTC-based communication connection between a host-end browser and a client-end browser by means of the network server, wherein the host-end browser is included in at least one of the plurality of hosts, and wherein the client-end browser is included in at least one of the plurality of clients;
    receiving and displaying a live broadcast data sent from the host end browser, wherein the live broadcast data comprise video and audio data captured by the at least one of the plurality of hosts; and
    processing popping-screen data by means of the client-end browser, wherein the popping-screen data comprise comments on the live broadcast data by the at least one of the plurality of clients and other clients among the plurality of clients, and wherein the processing popping-screen data further comprises:
        transmitting the popping-screen messages to the host-end browser by means of a browser interface named RTC data channel API, and
        transmitting the popping-screen messages to the network server by means of a WebSocket-based connection.

2. The method as claimed in claim 1, wherein both of the host-end browser and the client-end browser are HTML5-based browsers.

3. The method as claimed in claim 2, wherein the step of building the connection further comprises:
    registering the host-end browser by the host and building a WebSocket-based connection with the network server, and then acquiring an audio/video data stream sent from a host-end equipment, by means of a browser interface named Media Stream API;
    registering the client-end browser by the client and building a WebSocket-based connection with the network server; and
    building a communication channel between the host end and the client end by means of the network server;
    wherein the network server utilizes an ICE framework to implement a NAT transversal, so as to build a communication channel for transmitting signals between the host end and the client end.

4. The method as claimed in claim 3, the host-end equipment comprising a camera and a microphone connected to the browser interface named Media Stream API.

5. The method as claimed in claim 3, the signals comprising:
    conversation messages used for initializing a communication and a debug process;
    network allocations including an IP address and a port; and
    media adaptation including an encoder and a differential rate acceptable to the browsers in both of a transmitting end and a receiving end.

6. The method as claimed in claim 1, wherein in the sub-step of receiving and displaying the live broadcast data sent from the host-end browser, the client-end browser receives an audio stream and a video stream sent from the host end by means of in browser interface named RTC Peer Connection API, and then shows the audio stream and the video stream by means of a video tag in the HTML5-based browser, and wherein the client-end browser receives and shows a text data sent from the host-end by means of a browser interface named RTC data channel API.

7. The method as claimed in claim 6, wherein the text data comprises documents and popping-screen messages, and the popping messages are displayed on a popping-screen layer.

8. The method according to claim 2, wherein the network server transmits popping-screen messages sent by other client ends, to the client-end browser by means of a WebSocket-based connection, and the client-end browser displays the popping messages on a popping-screen layer.

9. The method as claimed in claim 3, wherein the audio/video data stream comprise audio tracks and video tracks.

10. The method as claimed in 1, the client-end comprising:
    a processor; and
    a memory communicatively coupled to the processor and storing instructions that upon execution by the processor cause the client terminal to:
    receive and show the live broadcast data sent from the host-end by means of the client browser; and
    process popping-screen data by means of the client-end browser.

11. The method as claimed in claim 3, the host-end equipment further comprising:
    a processor; and a memory communicatively coupled to the processor and storing instructions that upon execution by the processor cause the host end to build a Web Socket-based connection with the network server.

12. The method as claimed in claim 1, the network server comprising:
a processor; and
a memory communicatively coupled to the processor and storing instructions that upon execution by the processor cause the server to build a WebRTC-based communication connection between a host-end browser and a client-end browser.

13. The method as claimed in claim 3, the network server comprising:
a processor; and
a memory communicatively coupled to the processor and storing instructions that upon execution by the processor cause the server to utilize an ICE framework to implement a NAT transversal, so as to build a communication channel for transmitting signals between the host end and the client end.

14. A system for an audio/video live broadcast via an HTML5-based browser among a network community comprising a plurality of hosts, a network server, and a plurality of clients, comprising:
a host-end browser of at least one of the plurality of hosts configured to sending a live broadcast data to the plurality of clients, wherein the live broadcast data comprise video and audio data captured by the at least one of the plurality of hosts;
a network server configured to build a WebRTC-based communication connection between the host-end browser and the client-end browser; and
a client-end browser of at least one of the plurality of clients configured to process data, wherein processing data further comprises processing popping-screen data by means of the client-end browser, wherein the popping-screen data comprises comments on the live broadcast data by the at least one of the plurality of clients and other clients among the plurality of clients, and wherein the processing popping-screen data further comprises:
transmitting the popping-screen messages to the host-end browser by means of a browser interface named RTC data channel API, and
transmitting the popping-screen messages to the network server by means of a Web Socket-based connection.

15. The system as claimed in claim 14, wherein the network server utilizes an ICE framework to implement a NAT transversal, so as to build a communication channel for transmitting signals between the host end and the client end.

16. The system as claimed in claim 14, wherein both of the host-end browser and the client-end browser are HTML5-based browsers.

17. The system as claimed in claim 14, wherein the host end equipment further comprises a browser interface named Media Stream API, and a camera and a microphone connected to the browser interface named Media Stream API.

\* \* \* \* \*